United States Patent
Michida

(10) Patent No.: US 7,430,165 B2
(45) Date of Patent: Sep. 30, 2008

(54) WIRELESS COMMUNICATION DEVICE AND RADIO COMMUNICATION SYSTEM USING THE SAME

(75) Inventor: Masaaki Michida, Tokyo (JP)

(73) Assignee: NEC Corporation, Tokyo (JP)

( * ) Notice: Subject to any disclaimer, the term of this patent is extended or adjusted under 35 U.S.C. 154(b) by 537 days.

(21) Appl. No.: 10/528,046

(22) PCT Filed: Sep. 17, 2003

(86) PCT No.: PCT/JP03/11828

§ 371 (c)(1),
(2), (4) Date: Mar. 16, 2005

(87) PCT Pub. No.: WO2004/028023

PCT Pub. Date: Apr. 1, 2004

(65) Prior Publication Data

US 2006/0057971 A1    Mar. 16, 2006

(30) Foreign Application Priority Data

Sep. 18, 2002    (JP)    ............................. 2002-270852

(51) Int. Cl.
*H04L 12/26*    (2006.01)
(52) U.S. Cl. ....................................................... 370/220
(58) Field of Classification Search ........................ None
See application file for complete search history.

(56) References Cited

U.S. PATENT DOCUMENTS

| 5,075,697 | A | * | 12/1991 | Koizumi et al. | ............. | 342/361 |
| 5,701,595 | A | * | 12/1997 | Green, Jr. | .................... | 455/83 |
| 5,708,684 | A | * | 1/1998 | Ueda | .......................... | 375/358 |

FOREIGN PATENT DOCUMENTS

| JP | 11-234221 | A | | 8/1999 |
| JP | 2001-086051 | | | 3/2001 |
| JP | 2001-086051 | A | | 3/2001 |
| JP | 2001-86051 | A | | 3/2001 |
| JP | 2001086051 | A | * | 3/2001 |

* cited by examiner

*Primary Examiner*—Chirag G Shah
*Assistant Examiner*—Otis L Thompson, Jr.
(74) *Attorney, Agent, or Firm*—Foley & Lardner LLP

(57) ABSTRACT

A wireless communication apparatus has a current system and a standby system independent of each other. An interface circuit 1*a* of a radio 10*a* outputs two signals input from an MUX device 101 as a signal of a current system and a signal of a standby system to a V polarization transmitter/receiver 2*a* and an H polarization transmitter/receiver 3*a*. Signals transmitted from the V polarization transmitter/receiver 2*a* and the H polarization transmitter/receiver 3*a* are received by a V polarization transmitter/receiver 2*b* and a H polarization transmitter/receiver 3*b* of a radio 10*b*, and output to the interface circuit 1*b*. Then the interface circuit 1*b* transmits a signal of the current system and a signal of the standby system from the V polarization transmitter/receiver 2*b* and the H polarization transmitter/receiver 3*b* to the MUX device 102.

8 Claims, 5 Drawing Sheets

(a)

CO-CHANNEL FREQUENCY DEVICE (b)

INTERLEAVE FREQUENCY DEVICE

WIRELESS COMMUNICATION DEVICE AND RADIO COMMUNICATION SYSTEM USING THE SAME

TECHNICAL FIELD

The present invention relates to a wireless communication apparatus and a wireless communication system for use with the apparatus, and more specifically to a wireless communication apparatus having a redundant configuration and a wireless communication system for use with the apparatus.

BACKGROUND ART

Conventionally, a radio for microwave digital communication in STM-N (synchronous transport module-level N) transmission uses an MSP (multiplex section protection) system as a system for support of duplex of STM-N interface. The MSP system is described in, for example, the ITU-T Recommendation G.782 or G.783, etc.

The wireless communication system for performing wireless communication between the above-mentioned radios is explained below by referring to the (1+1) configuration which is the smallest configuration of the (N+1) configuration as the configuration of each radio. FIG. 1 shows the configuration of the conventional wireless communication system.

As shown in FIG. 1, the conventional wireless communication system is configured by radios 30a and 30b and MUX devices 101 and 102. The radio 30a is configured by an interface circuit 21a, a current transmitter/receiver 22a, a standby transmitter/receiver 23a, a circulator 24a, and an antenna 25a. The radio 30b is configured by an interface circuit 21b, a current transmitter/receiver 22b, a standby transmitter/receiver 23b, a circulator 24b, and an antenna 25b.

The MUX devices 101 and 102 are connected to the respective node devices not shown in the attached drawings, and each of the MUX devices 101 and 102 multiplexes an input signal from a node device connected to it, branches the multiplexed signal (STM-N signal), and then transmits the two same branched STM-N signals to optical transmission lines 210 and 220 (250 and 260).

The two STM-N signals output from the MUX device 101 is input to the interface circuit 21a of the radio 30a through the optical transmission lines 210 and 220. The interface circuit 21a selects one of the two input STM-N signals, branches the selected signal into two signals for transmission through the current radio circuit and the standby radio circuit between the radios 30a and 30b, and then outputs the branched signals to the current transmitter/receiver 22a and the standby transmitter/receiver 23a.

Each of the current transmitter/receiver 22a and the standby transmitter/receiver 23a modulates an input signal, converts the modulated signal to a radio frequency of an RF band, and then transmits the conversion result to the radio 30b which is an opposite station through the circulator 24a and the antenna 25a. The signal (the signal from the current transmitter/receiver 22a and the signal from the standby transmitter/receiver 23a) received through the antenna 25b of the radio 30b is input to the current transmitter/receiver 22b and the standby transmitter/receiver 23b through the circulator 24b.

Each of the current transmitter/receiver 22b and the standby transmitter/receiver 23b converts an RF received signal to a signal of an intermediate frequency band, demodulates it, and outputs a base band digital signal which is a demodulation signal to the interface circuit 21b. The interface circuit 21b selects one of the two input base band digital signals from the current transmitter/receiver 22b and the standby transmitter/receiver 23b, branches the selected signals into two signals, and then outputs the branched signals to the MUX device 102 through the optical transmission lines 270 and 280.

The frequency distribution at the radio frequencies of the current radio circuit and the standby radio circuit between the radios 30a and 30b is the interleave distribution as shown in FIG. 2B. That is, the current transmitter/receivers 22a and 22b use the frequency F0 shown in FIG. 2B, and the standby transmitter/receivers 23a and 23b use the frequency F2 shown in FIG. 2B.

FIG. 3 shows the configuration of the interface circuits 21a and 21b shown in FIG. 1, and the components also shown in FIG. 1 are assigned the same reference numerals. As shown in FIG. 3, each of the interface circuits 21a and 21b is configured by STM-N input interface circuits 31 and 32, a selection circuit 33, a control circuit 34, a branch circuit 35, a selection circuit 37, a branch circuit 38, STM-N output interface circuits 39 and 40, and a CLK providing circuit 36. The CLK providing circuit 36 provides a generated clock to the STM-N input interface circuits 31 and 32 and the STM-N output interface circuits 39 and 40.

The two STM-N signals transmitted from the MUX device 101 to the optical transmission lines 210 and 220 are input to the STM-N input interface circuits 31 and 32 of the interface circuit 21a. Each of the STM-N input interface circuits 31 and 32 performs signal processing of MSOH (multiplex section overhead), which is an overhead signal of an input STM-N signal, and signal processing of transferring the input STM-N signal from the CLK providing circuit 36 to a clock to be provided. Each of the STM-N input interface circuits 31 and 32 monitors the quality of the input STM-N signal, and outputs the monitor result to the control circuit 34.

The control circuit 34 controls the selection circuit 33 to select a signal having better signal quality from between the two STM-N signals based on the monitor result from the STM-N input interface circuits 31 and 32. The selection circuit 33 selects a better signal from between the two signals from the STM-N input interface circuits 31 and 32, and outputs the selected signal. The branch circuit 35 branches the signal from the selection circuit 33 into two signals, and outputs them to the current transmitter/receiver 22a and the standby transmitter/receiver 23a.

Meanwhile, the two signals output from the current transmitter/receiver 22a and the standby transmitter/receiver 23a are input to the selection circuit 37 of the interface circuit 21a. The selection circuit 37 selects a signal from the current transmitter/receiver 22a from between the two input signals, and outputs the selected signal. The branch circuit 38 branches the signal from the selection circuit 37 into two signals, and outputs the branched signals from the selection circuit 37 to the STM-N output interface circuits 39 and 40. When a failure occurs in the current system, the selection circuit 37 selects a signal from the standby transmitter/receiver 23a and outputs it.

The STM-N output interface circuits 39 and 40 of the interface circuit 21a convert the input signal from the branch circuit 38 to an STM-N signal, and transmit it to the MUX device 101 through the optical transmission lines 230 and 240. The operation of the interface circuit 21b is similar to the operation of the interface circuit 21a.

[Patent Document 1]

Japanese Patent Laid-Open No. 2001-86051 (page 3, FIG. 1)

PROBLEMS TO BE SOLVED BY THE INVENTION

As explained above, each of the STM-N interface portion and a radio portion of a radio has conventionally been defined as a redundant configuration corresponding to the STM-N redundant configuration (duplexed optical transmission line). The interface portion selects a signal having better quality from between the two input signals from the duplexed optical transmission lines, and uses the selected signal in the current and standby wireless circuits, which is the MSP system. The radio portion has the redundant configuration of transmitting the selected signal through the current and standby wireless circuits. It is common to set interleave frequency distribution as frequency distribution to be used for current and standby wireless circuits.

However, as shown in FIG. 3, there is no redundant configuration between the selection circuit 33 and the branch circuit 35 and between the selection circuit 37 and the branch circuit 38. Thus, there occurs the problem that a failure arising in the common portion having no redundant configuration cannot be relieved.

Furthermore, since the interface portion uses the MSP system, it is necessary to set an MST (multiplex section termination) configuration requested for the MSP system. That is, the CLK providing circuit 36 and an MSOH terminating circuit (which is provided in the interface circuits 31 and 32 or between the selection circuit 33 and the branch circuit 35) are required.

In addition, with an interleaving frequency arrangement, an RF frequency for two channels is required.

The patent document 1 describes a wireless communication system in which the current circuit and the standby circuit are configured by a cross polarization transmission circuit for transmission of electric waves having the same frequencies and different polarization directions. However, in this wireless communication system, a radio device branches an input signal into a signal for the current system and a signal for the standby system, and when a fault occurs in the current system, a signal of the standby system received from another radio device is selected and output using a signal switch unit of the original radio device. That is, in the radio device, the current system and the standby system is not completely separated, thereby causing the problem that a current system signal and a standby system signal received by the radio device have to be controlled and switched.

The present invention aims at providing a wireless communication apparatus in which the current system and the standby system are independent of each other, and a wireless communication system for use with the apparatus.

DISCLOSURE OF THE INVENTION

The wireless communication apparatus in an MSP system according to the present invention has a redundant configuration and receives the same signals from an MUX device through a current cable circuit and a standby cable circuit, and includes: current communication means having a current cable circuit configured by a current STM-N input interface circuit for receiving a signal from an MUX device connected to a node, a current STM-N output interface circuit for outputting a signal to the MUX device, a current transmitter/receiver connected to the current STM-N input interface circuit and the current STM-N output interface circuit, and a current circulator connected to the current transmitter/receiver, and a current radio circuit, configured by an antenna connected to the current circulator, for transmitting/receiving a signal to and from another radio device; and standby communication means having a standby cable circuit configured by a standby STM-N input interface circuit for receiving a signal from the MUX device, a standby STM-N output interface circuit for outputting a signal to the MUX device, a standby transmitter/receiver connected to the standby STM-N input interface circuit and the standby STM-N output interface circuit, and a standby circulator connected to the standby transmitter/receiver, and a standby radio circuit, configured by an antenna connected to the standby circulator, for transmitting/receiving a signal to and from the other radio device, uses a co-channel radio frequency distribution, and completely duplexes input through output of an STM-N signal in the apparatus.

In the wireless communication apparatus, the radio signals transmitted from the current communication means and the standby communication means are polarization signals having the same frequencies and different polarization directions.

In the wireless communication apparatus, the current communication means receives a signal transmitted from a current communication means of the other wireless communication apparatus through the current radio circuit, and transmits the received signal to the MUX apparatus through the current cable circuit, and the standby communication means receives a signal transmitted from a standby communication means of the other wireless communication apparatus through the standby radio circuit, and transmits the received signal to the MUX apparatus through the standby cable circuit.

The wireless communication system according to the present invention performs wireless communications in an MSP system using wireless communication apparatuses which have a redundant configuration, receive the same signals from an MUX device to each wireless communication apparatus through a current cable circuit and a standby cable circuit, and each of the wireless communication apparatuses includes; current communication means having a current cable circuit configured by a current STM-N input interface circuit for receiving a signal from an MUX device connected to a node, a current STM-N output interface circuit for outputting a signal to the MUX device, a current transmitter/receiver connected to the current STM-N input interface circuit and the current STM-N output interface circuit, and a current circulator connected to the current transmitter/receiver, and a current radio circuit, configured by an antenna connected to the current circulator, for transmitting/receiving a signal to and from another radio device; and standby communication means having a standby cable circuit configured by a standby STM-N input interface circuit for receiving a signal from the MUX device, a standby STM-N output interface circuit for outputting a signal to the MUX device, a standby transmitter/receiver connected to the standby STM-N input interface circuit and the standby STM-N output interface circuit, and a standby circulator connected to the standby transmitter/receiver, and a standby radio circuit, configured by an antenna connected to the standby circulator, for transmitting/receiving a signal to and from the other radio device, uses a co-channel radio frequency distribution, and completely duplexes input through output of an STM-N signal in the apparatus.

In the wireless communication apparatus, the radio signals transmitted from the current communication means and the standby communication means are polarization signals having the same frequencies and different polarization directions.

In the wireless communication apparatus, the current communication means receives a signal transmitted from a current communication means of the other wireless communication apparatus through the current radio circuit, and transmits the received signal to the upper apparatus through the current cable circuit, and the standby communication means receives a signal transmitted from a standby communication means of the other wireless communication apparatus through the standby radio circuit, and transmits the received signal to the upper apparatus through the standby cable circuit.

Described below is the operation according to the present invention. Current communication means of a wireless communication apparatus transmits one of the same signals from the upper apparatus of the wireless communication apparatus as a radio signal to another wireless communication apparatus through a current radio circuit. Standby communication means transmits another same signal as a radio signal to another wireless communication apparatus through a standby radio circuit. Thus, the wireless communication apparatus does not select one of the same signals from the upper apparatus to branch the selected signals into a current system signal and a standby system signal, but transmits the same signals from the upper apparatus to another wireless communication apparatus as a current signal and a standby signal.

The current communication means receives the signal transmitted from the current communication means of another wireless communication apparatus through the current radio circuit, and transmits the received signal to an upper apparatus. The standby communication means receives a signal transmitted from the standby communication means of the other wireless communication apparatus through the standby radio circuit, and transmits the received signal to the upper apparatus. Thus, the wireless communication apparatus does not select one of the character string and the standby signal and switch between the current system and the standby system, but transmits a current signal and a standby signal from the other wireless communication apparatus to the upper apparatus.

Then, the upper apparatus switches between the current system and the standby system.

Figure 1:
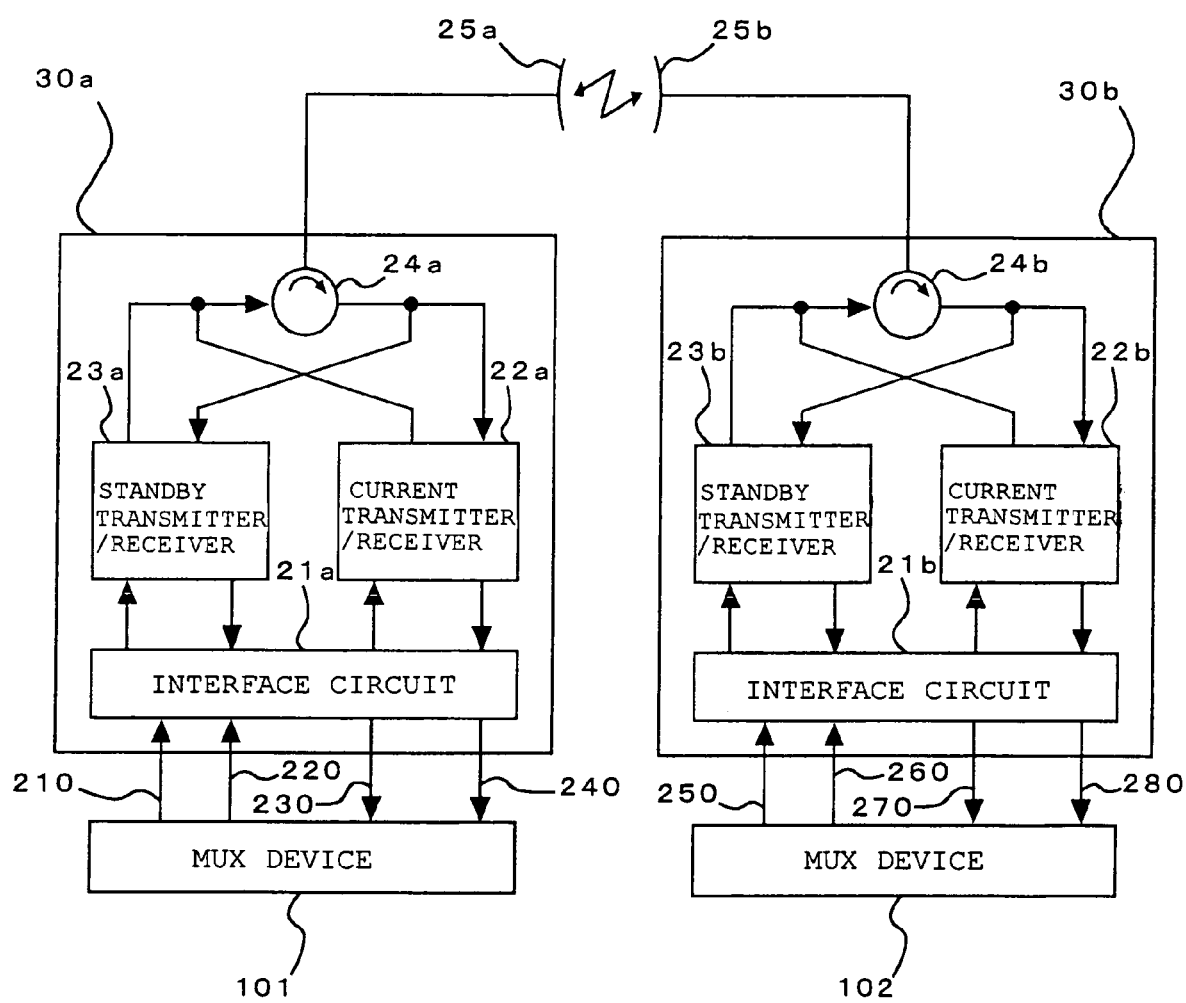
FIG. 1 shows the configuration of the conventional wireless communication system.

Reference numerals 1a and 1b designate interface circuits. Reference numerals 2a and 2b designate V polarization transmitters/receivers. Reference numerals 3a and 3b designate H polarization transmitters/receivers. Reference numerals 4a, 4b, 5a, and 5b designate circulators. Reference numerals 6a and 6b designate antennas. Reference numerals 10a and 10b designate radios. Reference numerals 11 and 12 designate STM-N input interface circuits. Reference numerals 13 and 14 designate STM-N output interface circuits. Reference numerals 101 and 102 designate MUX devices. Reference numerals 110 to 180 designate optical transmission lines.

BEST MODE FOR CARRYING OUT THE INVENTION

Figure 4:
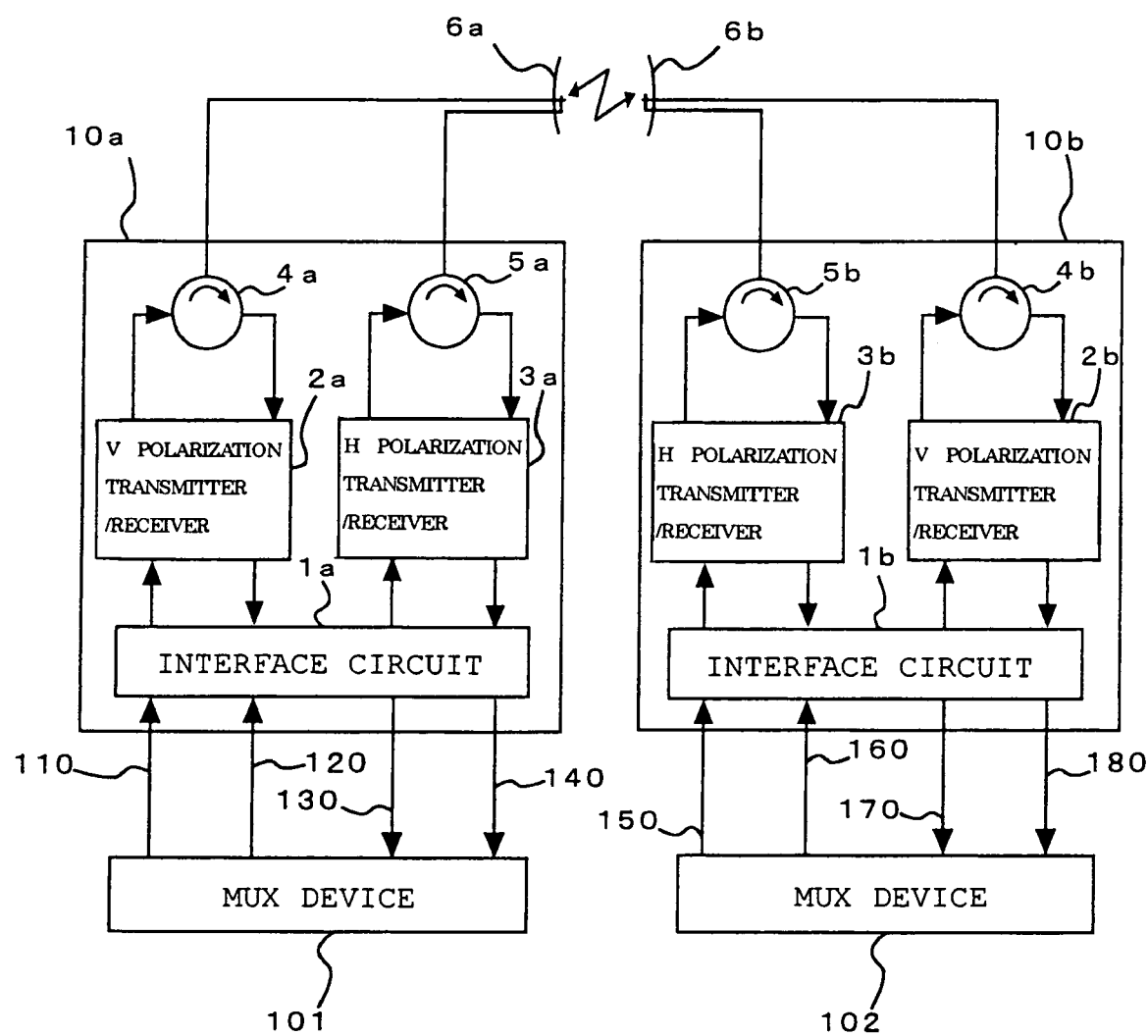
FIG. 4 shows the configuration of the wireless communication system according to an embodiment of the present invention.

The embodiments of the present invention are described below by referring to the attached drawings. FIG. 4 shows the configuration of the wireless communication system according to an embodiment of the present invention. As shown in FIG. 4, the wireless communication system according to an embodiment of the present invention is configured by the radios 10a and 10b and the MUX devices 101 and 102.

The radio 10a is configured by the interface circuit 1a, the V polarization transmitter/receiver 2a, the H polarization transmitter/receiver 3a, the circulators 4a and 5a, and the antenna 6a. The radio 10b is configured by the interface circuit 1b, the V polarization transmitter/receiver 2b, the H polarization transmitter/receiver 3b, the circulators 4b and 5b, and the antenna 6b.

Each of the MUX devices 101 and 102 is connected to a node device not shown in the attached drawings. The MUX device 101 multiplexes an input signal from the node device connected to itself, branches the multiplexed signal (STM-N signal) into two signals, and then transmits the two same STM-N signals to the down optical transmission lines 110 and 120. The MUX device 102 multiplexes an input signal from the node device connected to itself, branches the multiplexed signal (STM-N signal) into two signals, and then transmits the two identical STM-N signals to the down optical transmission lines 150 and 160.

The MUX device 101 selects one of the two STM-N signals input through the up optical transmission lines 130 and 140 as a received signal from the radio 10a, divides the selected signal into a plurality of signals, and transmits the signals to the node device connected to the MUX device 101. The MUX device 102 selects one of the two STM-N signals input through the up optical transmission lines 170 and 180 as a received signal from the radio 10b, divides the selected signal into a plurality of signals, and transmits the signals to the node device connected to the MUX device 102.

The selecting operation is performed by selection circuits (not shown in the attached drawings) in the MUX devices 101 and 102, and the selection circuits select one of the input signals as a received signal from a radio at an external instruction.

The interface circuit 1a processes each STM-N signal input through the optical transmission lines 110 and 120, and then outputs the results to the V polarization transmitter/receiver 2a and the H polarization transmitter/receiver 3a. The interface circuit 1b processes each STM-N signal input through the optical transmission lines 150 and 160, and then outputs the results to the V polarization transmitter/receiver 2b and the H polarization transmitter/receiver 3b.

The interface circuit 1a processes the base band digital signals from the V polarization transmitter/receiver 2a and the H polarization transmitter/receiver 3a, and then outputs them to the optical transmission lines 130 and 140. The interface circuit 14b processes the base band digital signals from the V polarization transmitter/receiver 2b and the H polarization transmitter/receiver 3b, and then outputs them to the optical transmission lines 170 and 180.

Each of the V polarization transmitter/receiver 2a and the H polarization transmitter/receiver 3a modulates a signal from the interface circuit 1a and converts the result to a radio frequency of the RF band, and then transmits it to the radio 10b, which is an opposite station, through the circulators 4a and 5*a*, and the antenna 6*a*. Each of the V polarization transmitter/receiver 2*b* and the H polarization transmitter/receiver 3*b* modulates a signal from the interface circuit 1*b* and converts the result to a radio frequency of the RF band, and then transmits it to the radio 10*a*, which is an opposite station, through the circulators 4*b* and 5*b*, and the antenna 6*b*.

The signal received by the antenna 6*a* is input to the V polarization transmitter/receiver 2*a* and the H polarization transmitter/receiver 3*a* through the circulators 4*a* and 5*a*. Each of the V polarization transmitter/receiver 2*a* and the H polarization transmitter/receiver 3*a* converts the RF received signal to a signal of an intermediate frequency band and demodulates the result, and then outputs a base band digital signal, which is a demodulation signal, to the interface circuit 1*a*.

The signal received by the antenna 6*b* is input to the V polarization transmitter/receiver 2*b* and the H polarization transmitter/receiver 3*b* through the circulators 4*b* and 5*b*. Each of the V polarization transmitter/receiver 2*b* and the H polarization transmitter/receiver 3*b* converts the RF received signal to a signal of an intermediate frequency band and demodulates the result, and then outputs a base band digital signal, which is a demodulation signal, to the interface circuit 1*b*.

Figure 5:
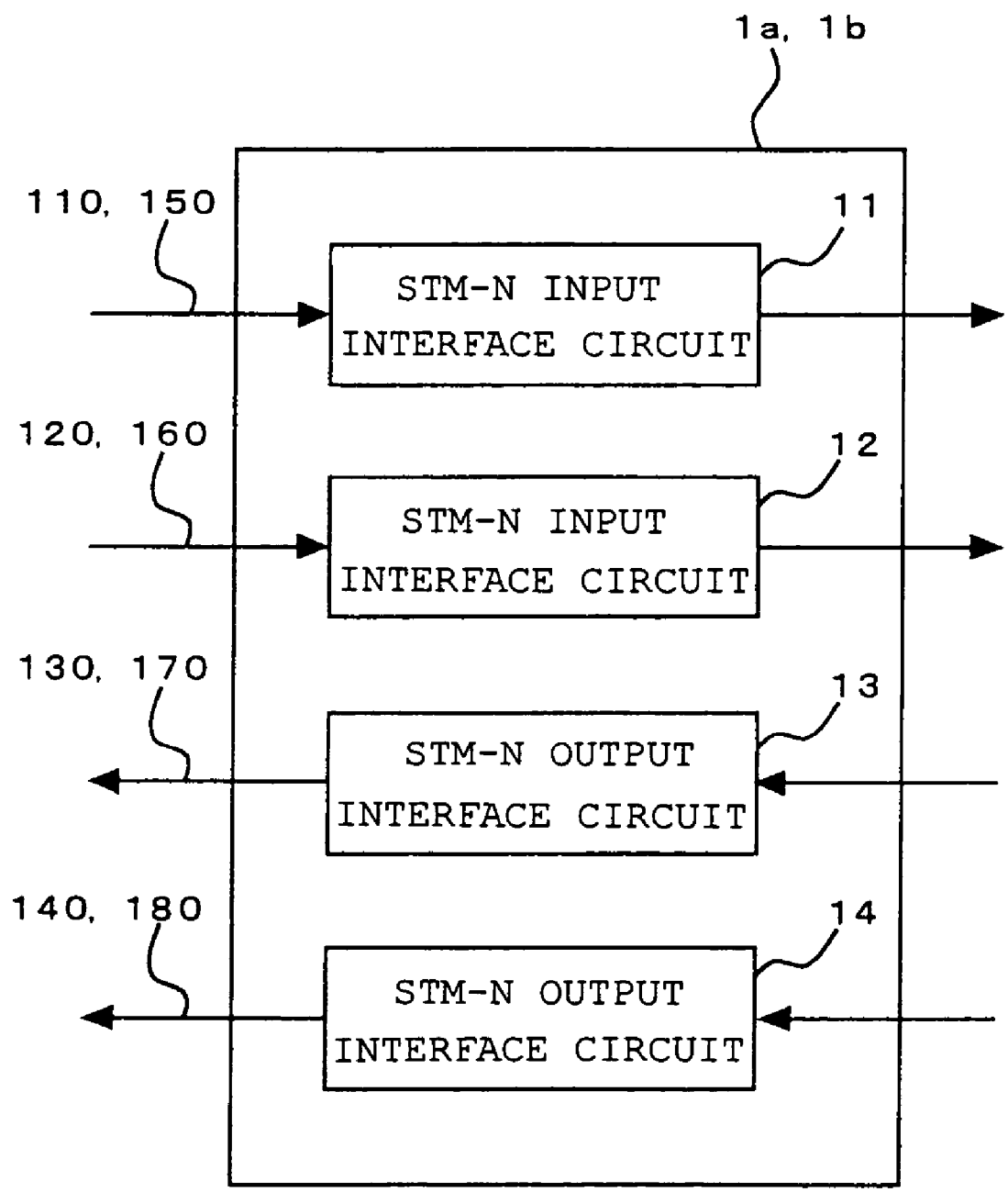
FIG. 5 shows the configuration of the interface circuits 1a and 1b shown in FIG. 4.

FIG. 5 shows the configuration of the interface circuits 1*a* and 1*b*. The components also shown in FIG. 4 are assigned the same reference numerals. As shown in FIG. 5, each of the interface circuits 1*a* and 1*b* is configured by the STM-N input interface circuits 11 and 12, and the STM-N output interface circuits 13 and 14.

The STM-N input interface circuit 11 converts the STM-N signal input from the MUX device 101 (102) through the optical transmission line 110 (150) to an NRZ (non-return-to-zero) signal, obtains frame synchronization, processes a signal of SOH (section overhead), etc., and then outputs the resultant signal to the V polarization transmitter/receiver 2*a* (2*b*). The STM-N input interface circuit 12 converts the STM-N signal input from the MUX device 101 (102) through the optical transmission line 120 (160) to an NRZ signal, obtains frame synchronization, processes a signal of SOH, etc., and then outputs the resultant signal to the H polarization transmitter/receiver 3*a* (3*b*).

The STM-N output interface circuit 13 converts the base band digital signal from the V polarization transmitter/receiver 2*a* (2*b*) to an STM-N signal, and then transmits it to the optical transmission line 130 (170). The STM-N output interface circuit 14 converts the base band digital signal from the H polarization transmitter/receiver 3*a* (3*b*) to an STM-N signal, and then transmits it to the optical transmission line 140 (180).

Then, the operation of the wireless communication system shown in FIG. 4 is explained below by referring to FIGS. 4 and 5. The operation is explained using the radio 10*a* as a transmitter and the radio 10*b* as a receiver.

In FIGS. 4 and 5, one of the two STM-N signals output from the MUX device 101 is input to the STM-N input interface circuit 11 of the interface circuit 1*a* through the optical transmission line 110, and the other is input to the STM-N input interface circuit 12 of the interface circuit 1*a* through the optical transmission line 120.

Each of the STM-N input interface circuits 11 and 12 performs a CMI (coded mark inversion)/NRZ conversion on an input STM-N signal, obtains frame synchronization, and performs the SOH signal processing. Then, the STM-N input interface circuit 11 outputs a base band digital signal, which is a result of processing an input STM-N signal, to the V polarization transmitter/receiver 2*a*. The STM-N input interface circuit 12 outputs a base band digital signal, which is a result of processing an input STM-N signal, to the H polarization transmitter/receiver 3*a*.

Figure 2:
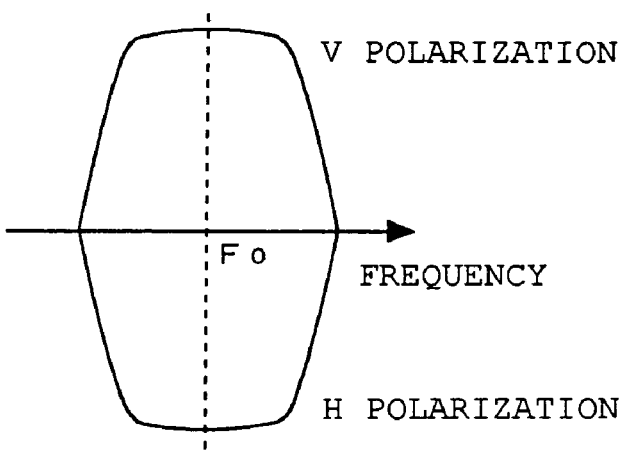
FIG. 2A shows the radio frequency distribution in the wireless communication system shown in FIG. 1.
FIG. 2B shows the radio frequency distribution in the conventional wireless communication system.
Figure 2:
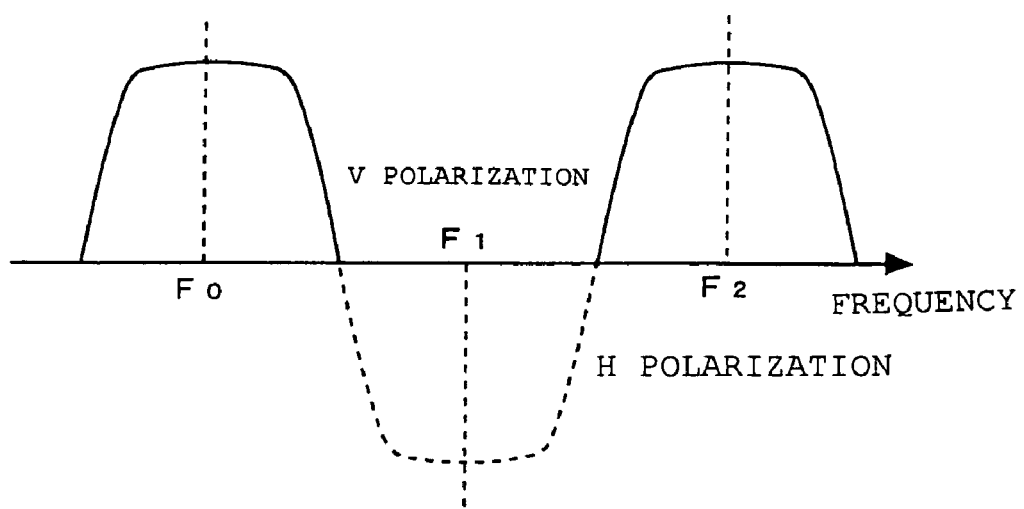

Each of the V polarization transmitter/receiver 2*a* and the H polarization transmitter/receiver 3*a* modulates a signal input from the interface circuit 1*a*, converts the result to a radio frequency of an RF band, and then outputs a conversion result to the antenna 6*a* through the circulators 4*a* and 5*a*. Signals from the V polarization transmitter/receiver 2*a* and the H polarization transmitter/receiver 3*a* are combined at the antenna 6*a*, and transmitted as a co-channel transmission from the antenna 6*a* to the radio 10*b*. The frequency distribution in the co-channel transmission is the co-channel distribution shown in FIG. 2A, and the signals from the V polarization transmitter/receiver 2*a* and the H polarization transmitter/receiver 3*a* are transmitted using the polarization plane having the same frequencies orthogonal to each other as shown in FIG. 2A.

That is, the signal from the V polarization transmitter/receiver 2*a* is transmitted as a V polarization signal from the antenna 6*a*, and received by the radio 10*b* through one of the current radio circuit and the standby radio circuit between the radios 10*a* and 10*b*. The signal from the H polarization transmitter/receiver 3*a* is transmitted as an H polarization signal from the antenna 6*a*, and received by the radio 10*b* through the other circuit of the current radio circuit and the standby radio circuit.

The V polarization transmitter/receiver 2*a* and the H polarization transmitter/receiver 3*a* use the same frequency F0 (refer to FIG. 2A) as an RF frequency. Therefore, as compared with the system shown in FIG. 1 in which the interleave distribution shown in FIG. 2B is applied, the system shown in FIG. 4 effectively uses the frequency.

The signal received by the antenna 6*b* of the radio 10*b* is separated as a V polarization signal or an H polarization signal, and input to the V polarization transmitter/receiver 2*b* or the H polarization transmitter/receiver 3*b*. That is, a V polarization signal is input to the V polarization transmitter/receiver 2*b* through the circulator 4*b*, and an H polarization signal is input to the H polarization transmitter/receiver 3*b* through the circulator 5*b*.

Each of the V polarization transmitter/receiver 2*b* and the H polarization transmitter/receiver 3*b* converts an RF received signal to a signal of an intermediate frequency band and then demodulates the converted signal, and outputs a demodulated base band digital signal to the interface circuit 1*b*. The V polarization transmitter/receiver 2*b* and the H polarization transmitter/receiver 3*b* can adopt the cross polarization interference compensation system. In the embodiment of the present invention, the orthogonal polarization transmission is performed between the radios 10*a* and 10*b* as described above. Therefore, there can be a problem of inter-polarization interference. However, by adopting the cross polarization interference compensation system, the effect of the inter-polarization interference can be suppressed, thereby realizing a desired wireless transmission.

A base band digital signal from the V polarization transmitter/receiver 2*b* is input to the STM-N output interface circuit 13 of the interface circuit 1*b*, and a base band digital signal from the H polarization transmitter/receiver 3*b* is input to the STM-N output interface circuit 14 of the interface circuit 1*b*.

Each of the STM-N output interface circuits 13 and 14 processes the SOH of an input base band digital signal, and converts the signal to an STM-N signal. Then, the STM-N output interface circuit 13 transmits the STM-N signal to the optical transmission line 170, and the STM-N output interface circuit 14 transmits the STM-N signal to the optical transmission line 180.

The MUX device 102 selects one of the two STM-N signals input through the optical transmission lines 170 and 180, divides the selected signal into a plurality of signals, and then transmits them to the node device connected to the MUX device 102 itself.

For example, if the current system comprises the V polarization transmitters/receivers 2a and 2b, the STM-N input interface circuit 11, the STM-N output interface circuit 13, and the optical transmission lines 110, 130, 150, and 170, and the standby system comprises the H polarization transmitter/receivers 3a and 3b, the STM-N input interface circuit 12, the STM-N output interface circuit 14, and the optical transmission lines 120, 140, 160, and 180, then the MUX device 102 normally selects the STM-N signal of the current system input through the optical transmission line 170 as a received signal from the radio 10b. However, if a fault occurs in the current system, the MUX device 102 switches from the current system to the standby system by selecting the STM-N signal of the standby system input through the optical transmission line 180 as a received signal from the radio 10b.

In the wireless communication system shown in FIG. 1, a radio uses the MSP system by selecting one of the two STM-N signals input from the MUX device and branching it into a signal of the current system and a signal of the standby system. Therefore, there is a common portion in the radio. Meanwhile, in the embodiment of the present invention, since a radio transmits to another radio the two STM-N signals input from the MUX device as a signal of the current system and a signal of the standby system, there is no common portion in the radio, and the input and output of a STM-N signal in the device is completely duplexed. Therefore, although a fault occurs in one of the current system and the standby system, it can be relieved.

Figure 3:
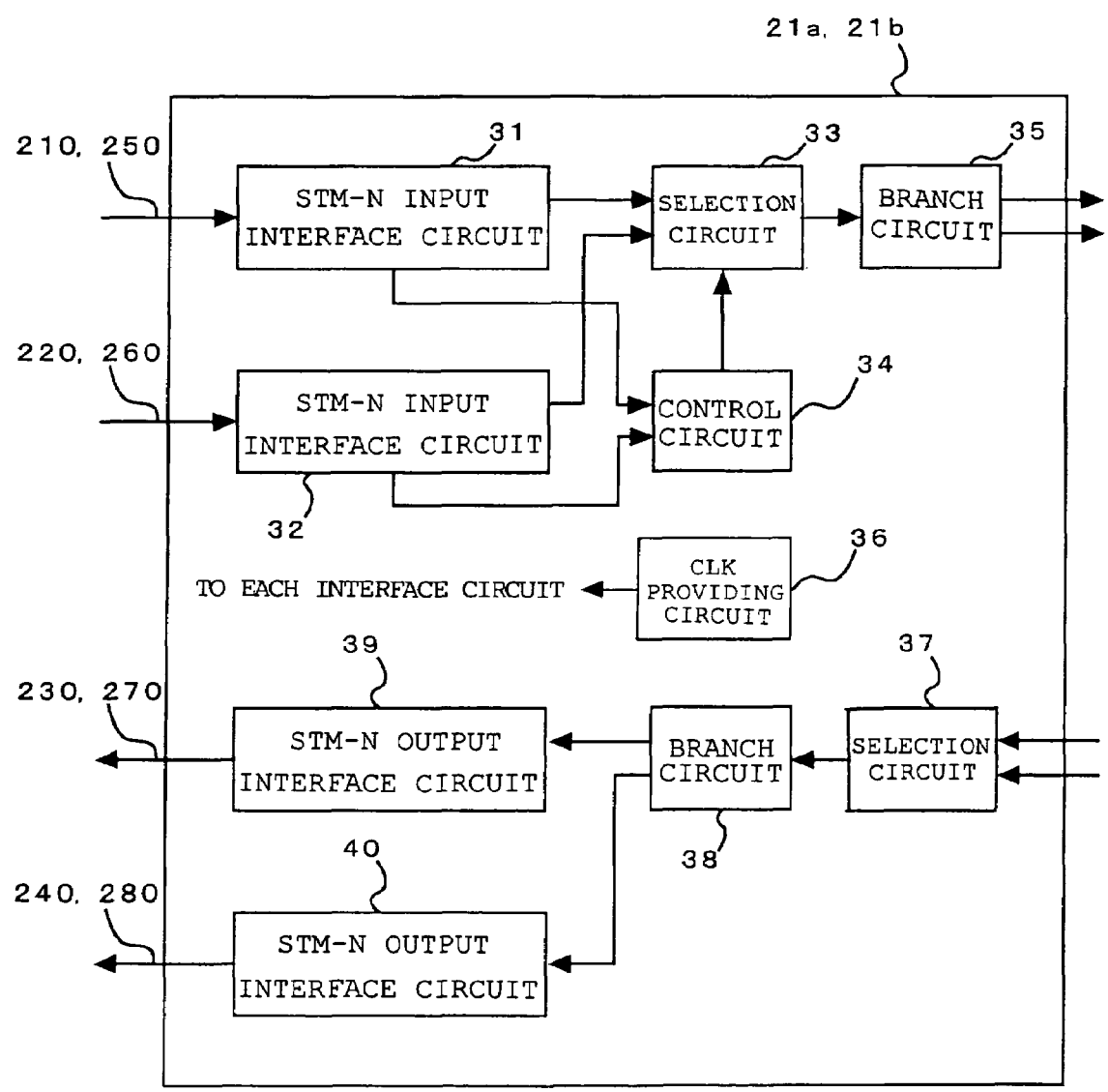
FIG. 3 shows the configuration of the interface circuits 21a and 21b shown in FIG. 1.

In the wireless communication system shown in FIG. 1, the selection circuit 37 (refer to FIG. 3) in the radio switches between the current system and the standby system. On the other hand, according to the present invention, the MUX device switches between the current system and the standby system. Therefore, it is not necessary to control switching in the radio, thereby simplifying the configuration of the radio.

Additionally, in the embodiment of the present invention, since duplex is realized in the system different from the MSP system, it is not necessary to configure the interface circuit in the MST configuration. That is, since the interface circuit does not select one of the two STM-N signals input from the MUX device and branch it, only the subordinate synchronization in which the clock of the interface circuit is subordinate to and in synchronization with the clock of the transmission line. Therefore, the interface circuit can have the RST (regenerator section termination) configuration requiring no CLK providing circuit or MSOH terminating circuit, thereby simplifying the configuration of the radio.

Furthermore, the embodiment of the present invention performs orthogonal polarization transmission using the polarization with the same frequencies orthogonal to each other in the current radio circuit and the standby radio circuit between the radios. Thus, the effective use of frequency can be realized.

INDUSTRIAL APPLICABILITY

The effect of the present invention is that a failure can be necessarily relieved so far as the fault occurs only in one of the current system and the standby system (simple fault) because the current system and the standby system are independent of each other by removing the common portion from a wireless communication apparatus.

The invention claimed is:

1. A wireless communication apparatus in a multiplex section protection (MSP) system having a redundant configuration and receiving same signals through a current cable circuit and a standby cable circuit, comprising:

current communication means comprising a current cable circuit configured by a current STM-N input interface circuit for receiving a signal from a MUX device connected to a node, a current STM-N output interface circuit for outputting a signal to the MUX device, a current transmitter/receiver connected to the current STM-N input interface circuit, a current circulator connected to the current transmitter/receiver, and a current radio circuit, configured by an antenna connected to the current circulator, for transmitting/receiving a signal to and from another radio device; and standby communication means comprising a standby cable circuit configured by a standby STM-N input interface circuit for receiving a signal from the MUX device, a standby STM-N output interface circuit for outputting a signal to the MUX device, a standby transmitter/receiver connected to the standby STM-N input interface circuit and the standby STM-N output interface circuit, a standby circulator connected to the standby transmitter/receiver, and a standby radio circuit, configured by an antenna connected to the standby circulator, for transmitting/receiving a signal to and from the other radio device, uses a co-channel radio frequency distribution, and completely duplexes input through output of an STM-N signal in the apparatus, wherein the radio signals transmitted from the current communication means and the standby communication means are polarization signals having the same frequencies and different polarization directions, and wherein the polarization signals having the same frequencies and different polarization directions are combined by the antenna and output having the co-channel radio frequency distribution.

2. The wireless communication apparatus according to claim 1, wherein:

the current communication means receives a signal transmitted from a current communication means of the other wireless communication apparatus through the current radio circuit, and transmits the received signal to the MUX apparatus through the current cable circuit; and the standby communication means receives a signal transmitted from a standby communication means of the other wireless communication apparatus through the standby radio circuit, and transmits the received signal to the MUX apparatus through the standby cable circuit.

3. A wireless communication system for performing wireless communications in a multiplex section protection (MSP) system using wireless communication apparatuses which have a redundant configuration, receive same signals from MUX device to each wireless communication apparatus through a current cable circuit and a standby cable circuit, each of the wireless communication apparatuses comprising:

current communication means comprising a current cable circuit configured by a current STM-N input interface circuit for receiving a signal from an MUX device connected to a node, a current STM-N output interface circuit for outputting a signal to the MUX device, a current transmitter/receiver connected to the current STM-N input interface circuit and the current STM-N output interface circuit, and a current circulator connected to the current transmitter/receiver, and a current radio circuit, configured by an antenna connected to the current circulator, for transmitting/receiving a signal to an from another radio device; and standby communication means comprising a standby cable circuit configured by a standby STM-N input interface circuit for receiving a signal from the MUX device, a standby STM-N output interface circuit for outputting a signal to the MUX device, a standby transmitter/receiver connected to the standby STM-N input interface circuit and the standby STM-N output interface circuit, and a standby circulator connected to the standby transmitter/receiver, and a standby radio circuit, configured by an antenna connected to the standby circulator, for transmitting/receiving a signal to and from the other radio device, uses a co-channel radio frequency distribution, and completely duplexes input through output of an STM-N signal in the apparatus, wherein the radio signals transmitted from the current communication means and the standby communication means are polarization signals having the same frequencies and different polarization directions, and wherein the polarization signals having the same frequencies and different polarization directions are combined by the antenna and output having the co-channel radio frequency distribution.

4. The wireless communication system according to claim 3, wherein:

the current communication means receives a signal transmitted from a current communication means of the other wireless communication apparatus through the current radio circuit, and transmits the received signal to the MUX apparatus through the current cable circuit, and the standby communication means receives a signal transmitted from a standby communication means of the other wireless communication apparatus through the standby radio circuit, and transmits the received signal to the MUX apparatus through the standby cable circuit.

5. The wireless communication apparatus according to claim 1, wherein:

the current communication means receives a signal transmitted from a current communication means of the other wireless communication apparatus through the current radio circuit, and transmits the received signal to the MUX apparatus through the current cable circuit; and the standby communication means receives a signal transmitted from a standby communication means of the other wireless communication apparatus through the standby radio circuit, and transmits the received signal to the MUX apparatus through the standby cable circuit.

6. The wireless communication system according to claim 3, wherein:

the current communication means receives a signal transmitted from a current communication means of the other wireless communication apparatus through the current radio circuit, and transmits the received signal to the MUX apparatus through the current cable circuit, and the standby communication means receives a signal transmitted from a standby communication means of the other wireless communication apparatus through the standby radio circuit, and transmits the received signal to the MUX apparatus through the standby cable circuit.

7. The wireless communication apparatus according to claim 1, wherein the different polarization directions are such that the radio signals transmitted from the current communication means and the standby communication means are orthogonal to each other in a polarization sense.

8. The wireless communication system according to claim 3, wherein the different polarization directions are such that the radio signals transmitted from the current communication means and the standby communication means are orthogonal to each other in a polarization sense.

* * * * *